United States Patent
Ensign, Jr.

(10) Patent No.: US 7,201,202 B2
(45) Date of Patent: Apr. 10, 2007

(54) NO-MASK STICKER MAKER

(75) Inventor: Thomas C Ensign, Jr., Scottsdale, AZ (US)

(73) Assignee: Xyron, Inc., Scottsdale, AZ (US)

( * ) Notice: Subject to any disclaimer, the term of this patent is extended or adjusted under 35 U.S.C. 154(b) by 124 days.

(21) Appl. No.: 10/864,799

(22) Filed: Jun. 10, 2004

(65) Prior Publication Data
US 2005/0016689 A1   Jan. 27, 2005

Related U.S. Application Data

(60) Provisional application No. 60/477,914, filed on Jun. 13, 2003.

(51) Int. Cl.
*B32B 37/00* (2006.01)

(52) U.S. Cl. ............... 156/540; 156/555; 156/582

(58) Field of Classification Search ............. 156/540, 156/555, 584, 230, 247, 289, 537, 538, 539, 156/580, 582, 583.1
See application file for complete search history.

(56) References Cited

U.S. PATENT DOCUMENTS

| | | | | |
|---|---|---|---|---|
| 3,415,706 A | * | 12/1968 | Ettre | 156/540 |
| 3,737,359 A | * | 6/1973 | Levitan | 156/555 |
| 4,495,014 A | * | 1/1985 | Gebrian et al. | 156/234 |
| 4,714,504 A | * | 12/1987 | Cummings et al. | 156/555 |
| 5,584,962 A | | 12/1996 | Bradshaw et al. | |
| 6,095,220 A | * | 8/2000 | Kobayashi et al. | 156/540 |
| 6,422,281 B1 | | 7/2002 | Ensign, Jr. et al. | |
| 6,527,028 B2 | * | 3/2003 | Miller | 156/555 |
| 6,843,297 B2 | * | 1/2005 | McKay et al. | 156/540 |
| 2002/0053398 A1 | | 5/2002 | Miller | |

FOREIGN PATENT DOCUMENTS

| | | |
|---|---|---|
| EP | 0 263 926 A2 | 4/1988 |
| EP | 0 263 926 A3 | 9/1988 |
| EP | 0 827 928 A1 | 3/1998 |

\* cited by examiner

*Primary Examiner*—James Sells
(74) *Attorney, Agent, or Firm*—Pillsbury Winthrop Shaw Pittman LLP

(57) ABSTRACT

A transfer device for adhering a transferable material to a target substrate is disclosed. The transfer device includes a supply of transfer substrate. The transfer substrate has a carrying surface and an adhesive-type transferable material provided on the carrying surface. A pressure applicator member has an engaging surface with a release characteristic and is positioned in pressure applying relation adjacent the carrying surface of the transfer substrate. The target substrate may be passed between the transfer substrate and the pressure applicator member so that the adhesive is transferred to the target substrate. The transfer device also includes a take-up roll for winding up spent portions of the transfer substrate from which the transferable material has been transferred to the target substrate.

8 Claims, 10 Drawing Sheets

NO-MASK STICKER MAKER

CROSS-REFERENCE TO RELATED APPLICATIONS

This application claims the benefit of priority from U.S. Provisional Application Ser. No. 60/477,914, entitled "NO-MASK STICKER MAKER," filed Jun. 13, 2003, the content of which is incorporated herein by reference in its entirety.

BACKGROUND OF THE INVENTION

1. Field of the Invention

The present invention relates to adhesive transfer devices.

2. Description of Related Art

U.S. Pat. Nos. 6,422,281 and 5,584,962 disclose examples of apparatus capable of performing adhesive transfer operations for applying a adhesive to a wide range of articles such as photographs, business cards, etc. While apparatus such as these are suitable for this purpose, it would be desirable to provide a simplified device having a lower cost structure.

SUMMARY OF THE INVENTION

One aspect of the present invention provides a transfer device for adhering a transferable material to a target substrate. The transfer device includes a supply of transfer substrate. The transfer substrate includes a carrying surface and an adhesive-type transferable material provided on the carrying surface. The transfer device further includes a pressure applicator member positioned in pressure applying relation adjacent the carrying surface of the transfer substrate so as to enable the target substrate to be advanced in a feeding direction between the pressure applicator member and the transfer substrate for transferring at least a portion of the transferable material from the transfer substrate to the target substrate. The pressure applicator member includes an engaging surface that engages the carrying surface of the transfer substrate and the transferable material thereon. The engaging surface has a release characteristic for essentially preventing the transferable material from adhering thereto so. As a result, as the transferable material is being transferred to the target substrate, any excess transferable material adjacent the target substrate will remain on the transfer substrate. The transfer device further includes a take-up roll for winding up spent portions of the transfer substrate from which the transferable material has been transferred to the target substrate.

Another aspect of the present invention provides a transfer device for adhering two transferable materials to a target substrate substantially simultaneously. The device includes a pair of supplies of transfer substrates. Each supply includes a carrying surface and an adhesive-type transferable material provided on the carrying surface. The transfer substrates are pressed together for enabling the target substrate to be fed therebetween to transfer the adhesive-type materials to opposing sides of the target substrate. The device also includes a pair of take-up rolls for winding up spent portions of the transfer substrates from which the transferable materials have been transferred to the target substrate.

These and other aspects, features, and advantages of this invention will become apparent from the following detailed description when taken in conjunction with the accompanying drawings, which are part of this disclosure and which illustrate, by way of example, the principles of this invention.

BRIEF DESCRIPTION OF THE DRAWINGS

Features of the invention are shown in the drawings, which form part of this original disclosure, in which.

DETAILED DESCRIPTION OF THE ILLUSTRATED EMBODIMENTS

Figure 1:
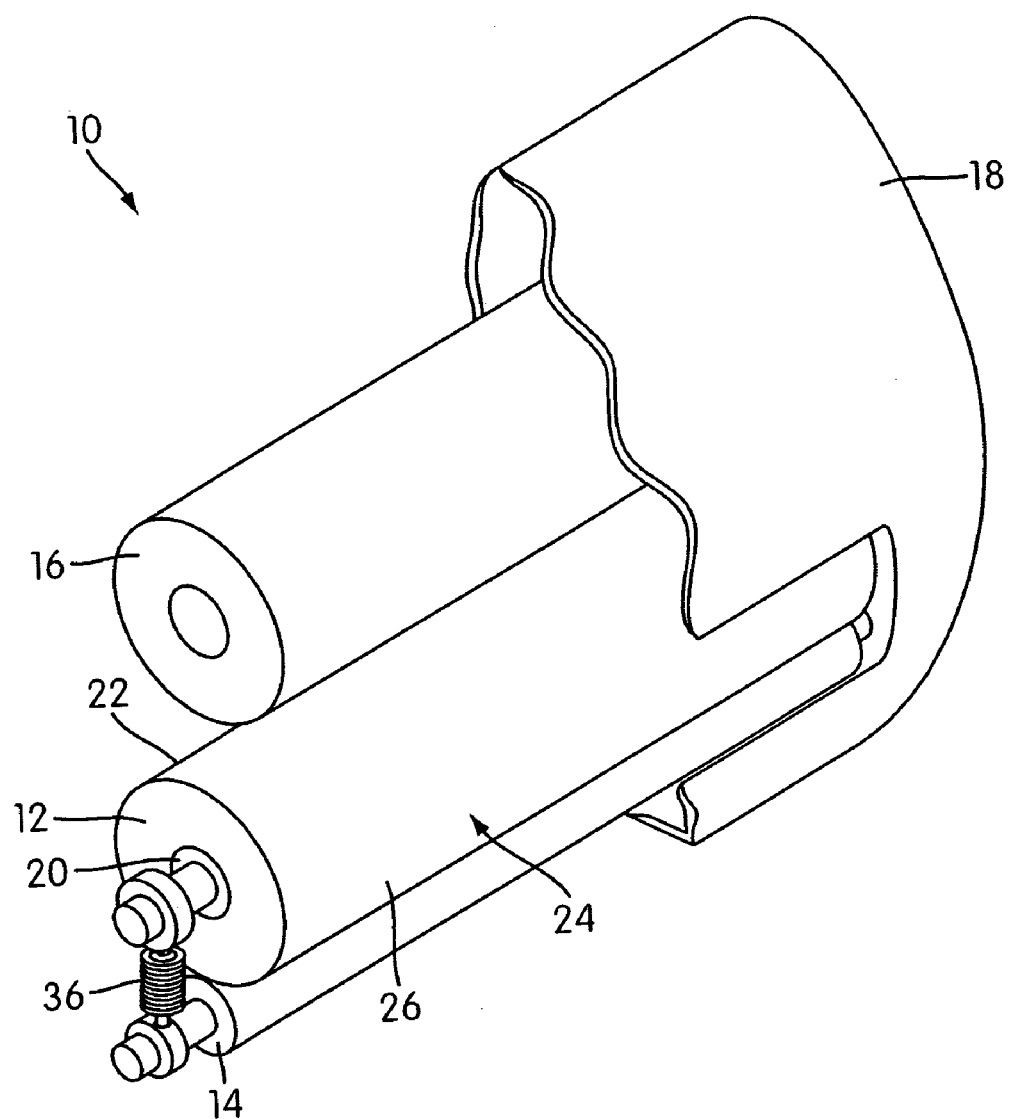
FIG. 1 is a perspective view of one embodiment of a transfer device of the present invention with part of the housing removed.
Figure 2:
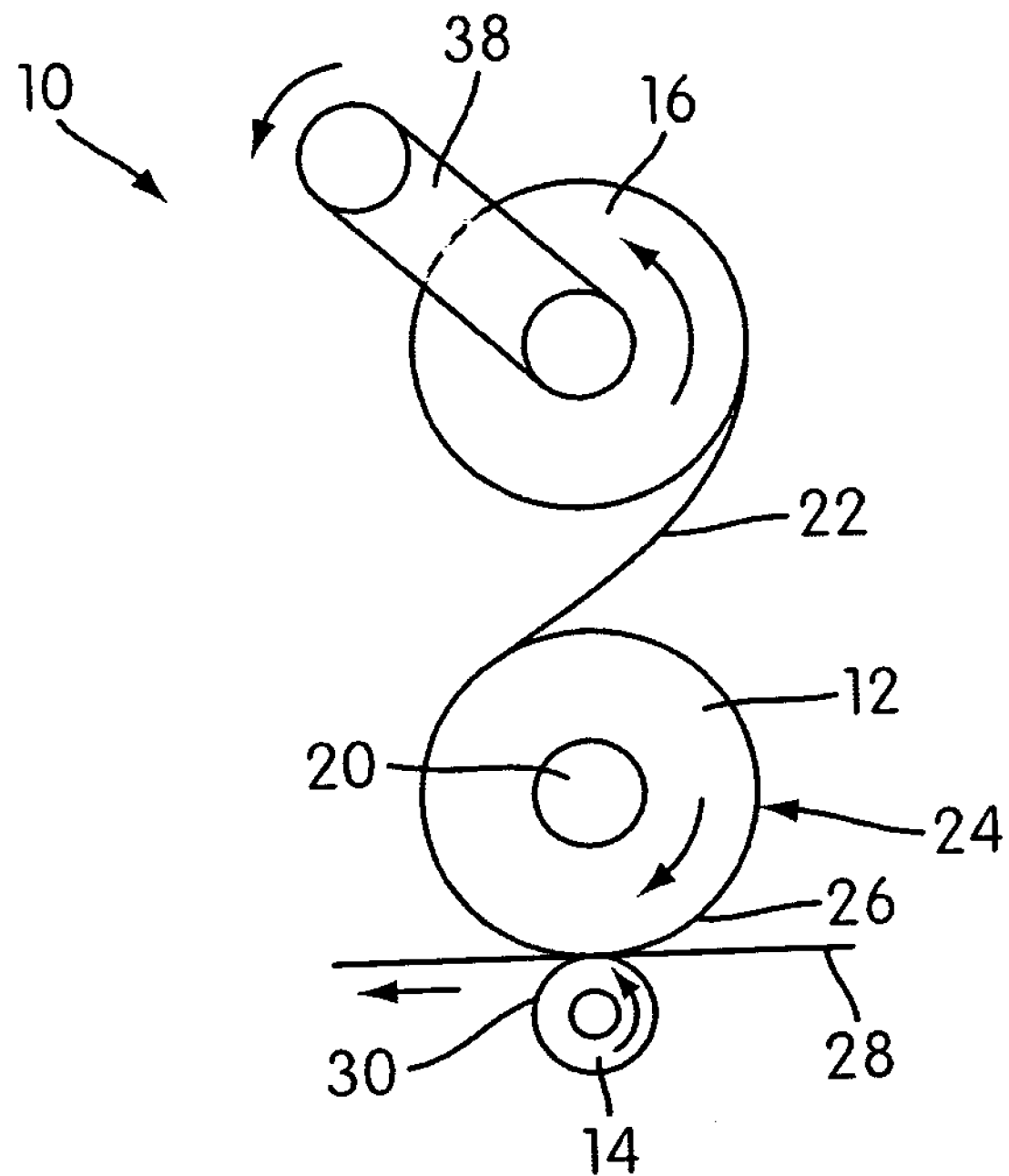
FIG. 2 is a schematic view of internal components of the embodiment of FIG. 1.
Figure 3A:
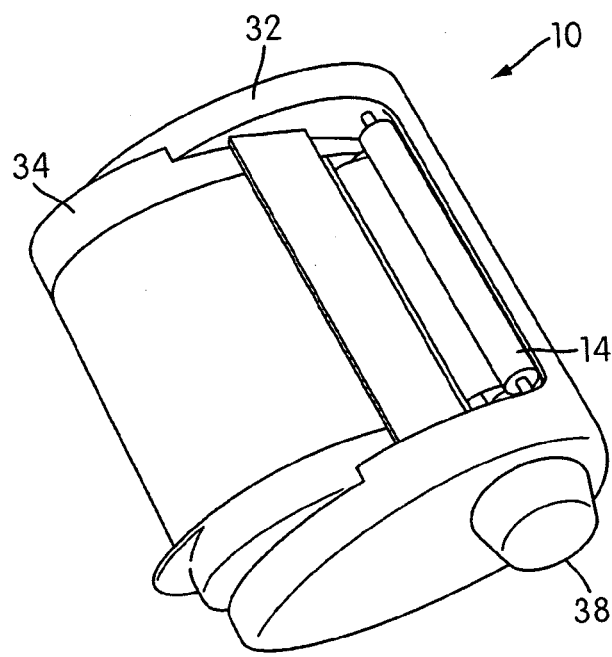
FIG. 3a is a picture of another embodiment of a transfer device of the present invention.
Figure 3B:
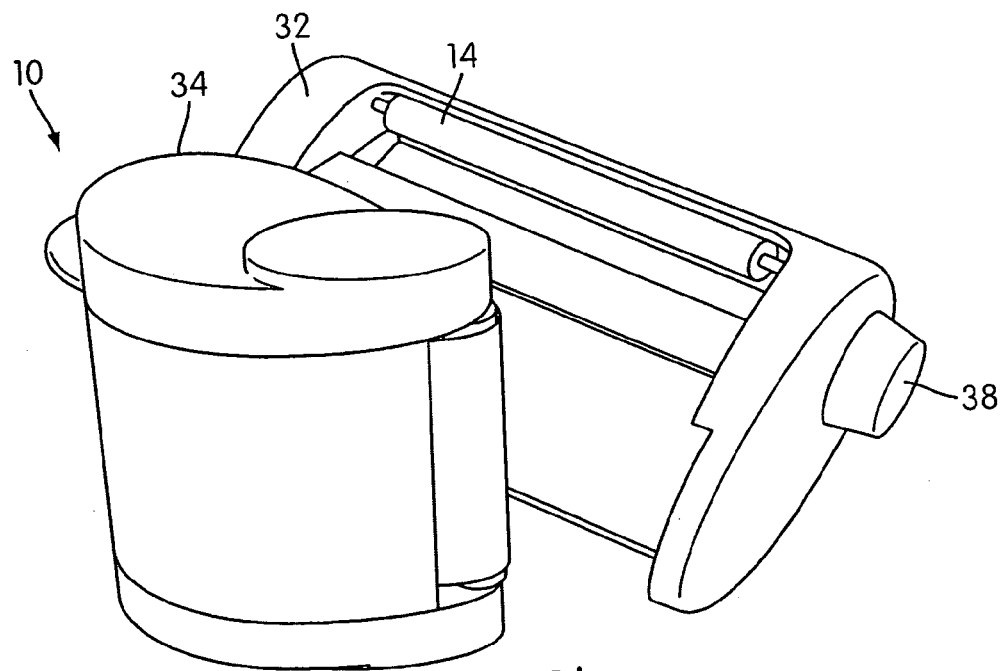
FIG. 3b is a picture of the same embodiment of FIG. 3a, but with a cartridge of the transfer device removed.

FIGS. 1 and 2 illustrate one embodiment of a transfer device 10 of the present invention. The transfer device 10 is configured to adhere a transferable material 26 to a target substrate 28. The target substrate 28 may be any type of substrate desired to be processed, including, but not limited to photographs, label stock, price tags, magazine cut-outs, name tags, small pieces of artwork, etc. The transfer device 10 may be of any suitable size. Embodiments of the transfer device 10 illustrated in FIGS. 1, 3a, and 3b are of a hand-held size that can be manually grasped with one hand and operated with the other. The transfer device 10 may also be of a larger size that requires the device to be set on a surface before using.

As shown in FIG. 1, the transfer device 10 may include a supply roll 12, a pressure applicator member 14, and a take up roll 16. Ends of the supply roll 12 and the take-up roll 16 may be coupled to a common housing 18 such that each roll may rotate about an axis. The housing 18 may be manufactured from plastic or any other suitable material including, but not limited to cardboard and metal.

The supply roll 12 includes core 20 and a wound supply of transfer substrate 22 wound about the core 20. The core 20 may include any suitable material including, but not limited to cardboard, plastic, and metal. The transfer substrate 22 includes a carrying surface 24 and an adhesive-type transferable material 26 that is provided on the carrying surface 24. In the arrangement illustrated in FIGS. 1 and 2, the transfer substrate 22 would be wound about the core 20 such that the carrying surface 24 of the transfer substrate 22 and the transferable material 26 face radially outward.

The adhesive-type transferable material 26 may be any type of material that sticks to the target substrate 28 by adherence. Thus, the term "adhesive-type" is used to define the transferable material 26 as being of the type that sticks by adherence. Generally, the transferable material 26 will be an adhesive provided on the carrying surface 24 in either a continuous coating or in a pattern coating. The amount of tack provided may be different depending on the particular adhesive that is used. For example, if a permanent sticker is desired, an adhesive that provides greater adhesion may be used as the transferable material 26. Similarly, if a removable sticker is desired, an adhesive that, provides less adhesion may be used as the transferable material 26. This way, different transferable materials 26 may be provided that are designed for specific uses. Also, the transferable material 26 may include decorative items such as glitter, foil articles, etc. that use adhesive to stick to the target substrate 28 or are formed from material having a level of tackiness for sticking to the target substrate 28. Any other transferable material may be applied to the target substrate 28 and the invention is not limited to the illustrated examples.

In the illustrated embodiment, the transferable material 26 is an adhesive for sticker making and the transfer substrate 22 includes a differential release liner coated with release material on both the carrying surface 24 and a back surface. The release material on the back surface will prevent the transferable material 26 from bonding thereto when the transfer substrate 22 is wound about the core 20 and being unwound therefrom. The release material on the carrying surface 24 will allow the transferable material 26 thereon to transfer to the target substrate upon the proper application of pressure without remaining bonded to the carrying surface 24. Thus, it is contemplated that the release material on the back surface may not have the same properties as the release material on the carrying surface 24, and typically it will have a lower affinity for adhesive bonding than the release material on the carrying surface 24. The release material may be silicone, a wax-like substance, or any other material that provides the desired release characteristics.

As shown in FIGS. 1 and 2, the pressure applicator member 14 is positioned in pressure applying relation adjacent the carrying surface 24 of the transfer substrate 22. This enables the target substrate 28 to be advanced in a feeding direction between the pressure applicator member 14 and the transfer substrate 22 for transferring at least a portion of the transferable material 26 from the transfer substrate 22 to the target substrate 28.

In the arrangement illustrated in FIGS. 1 and 2, the supply roll 12 and the pressure applicator member 14 are relatively movable toward one another and a biasing structure 36, such as one or more coil springs, is used to bias them together. This way, as the supply roll 12 is depleted and its radius becomes smaller, the pressure applying relation can be maintained between the two so as to ensure effective transfer of material from the transfer substrate 22 to the target substrate 28. As shown in FIG. 1, the biasing structure 36 is a pair of coil springs (only one can be seen) coupled between the supply roll 12 and the pressure applicator member 14. Preferably, the biasing is provided by a pair of coil springs connected between opposing ends so as to continually urge the supply roll 16 into engagement with the pressure applicator member 14. Reference can be made to U.S. Pat. No. 6,527,028, the entirety of which is incorporated herein by reference, for teachings in this regard. Alternatively, the pressure applicator 14 could be the structure that moves and is biased, but this is less preferable.

As shown in FIG. 2, the pressure applicator member 14 includes an engaging surface 30 that engages the target substrate 28 and the carrying surface 24 of the transfer substrate 22 during the transfer process. The engaging surface 30 has a release characteristic for essentially preventing the transferable material 26 from adhering to the pressure applicator member 14. The engaging surface 30 may be plasma coated or may include a low release silicone or any other type of non-stick coating or material. The release characteristic of the engaging surface 30 is higher than the release characteristic of the carrying surface 24 such that any transferable material 26 that comes into contact with the engaging surface 30 remains on the transfer substrate 22 (likewise, the engaging surface 30 may be described in the alternative as having a lower affinity for adhesive bonding). This way, as the transferable material 26 is being transferred to the target substrate 28, any excess transferable material 26 adjacent the target substrate 28 will remain on the transfer substrate 22 and will not adhere to the pressure applicator member 14.

Preferably, the material providing the release characteristic for the engaging surface 30 is highly durable and does not wear out easily. This avoids the need for replacement of the pressure applicator member 14 and/or re-coating of the engaging surface 30. Also, other arrangements may be used to provide a sufficient release characteristic. For example, a coating could be delivered from a reservoir to the engaging surface 30 via small pores in the engaging surface 30. The distribution may be by capillary action. Also, a coating could be brushed or otherwise applied to the engaging surface 30 as the applicator member 14 rotates.

The pressure applicator member 14 may be a rotatable nip roller or may be of any design that achieves the desired result. In another embodiment, the pressure applicator member 14 may be located on one portion of the device 32, such as the housing illustrated in FIGS. 3a and 3b, while the supply roll 12 and take-up roll 16 may be located on another portion of the device, such as a removable cartridge 34 that houses the supply roll 12 and take-up roll 16 and is removable to allow replacement when the supply roll 12 is depleted.

As shown in FIG. 2, the take-up roll 16 winds up spent portions of the transfer substrate 22 from which the transferable material 26 has been transferred to the target substrate 28. As discussed above, after the transfer substrate 22 comes into contact with the target substrate 28, only the transferable material 26 that has contacted the target substrate 28 will be removed from the transfer substrate 22. Thus, the transfer substrate 22 will include some of the transferable material 26 when it is wound about the take-up roll 16.

The transfer device 10 may also include an actuator 38, also shown in FIG. 2, that is operatively connected to at least the take-up roll 16 such that it affects the rotation of the take-up roll 16 for winding up the spent transfer substrate 22. By rotating the take-up roll 16, the supply roll 12 will necessarily rotate, so long as the transfer substrate 22 couples the two rolls. The actuator 38 may be a crank handle, a knob, an electric motor, or any type of actuator known in the art.

As an alternative, the take-up roll 16 may include a gear at one end that is operatively connected to a gear at one end of the supply roll 12, such that when one of the rolls rotates, the other roll rotates. A gear ratio may be determined by the relative size of the rolls such that when the rolls rotate, the take-up roll 16 accepts spent transfer substrate 22 as fast as the supply roll 12 dispenses transfer substrate 22. This way, either the supply roll 12 or the take-up roll 16, or both, may be operatively connected to the actuator 38.

It is also contemplated that, as an option, the actuator 38 may be operatively connected to the pressure applicator member 14, as illustrated in FIGS. 3a and 3b, such that the pressure applicator member 14 rotates as the actuator 38 is rotated. Because the pressure applicator member 14 is in pressure applying relationship with the supply roll 12, the supply roll 12 will rotate when the pressure applicator member 14 rotates. As described above, the supply roll 12 may be geared with the take-up roll 16 such that they rotate simultaneously.

Figure 4:
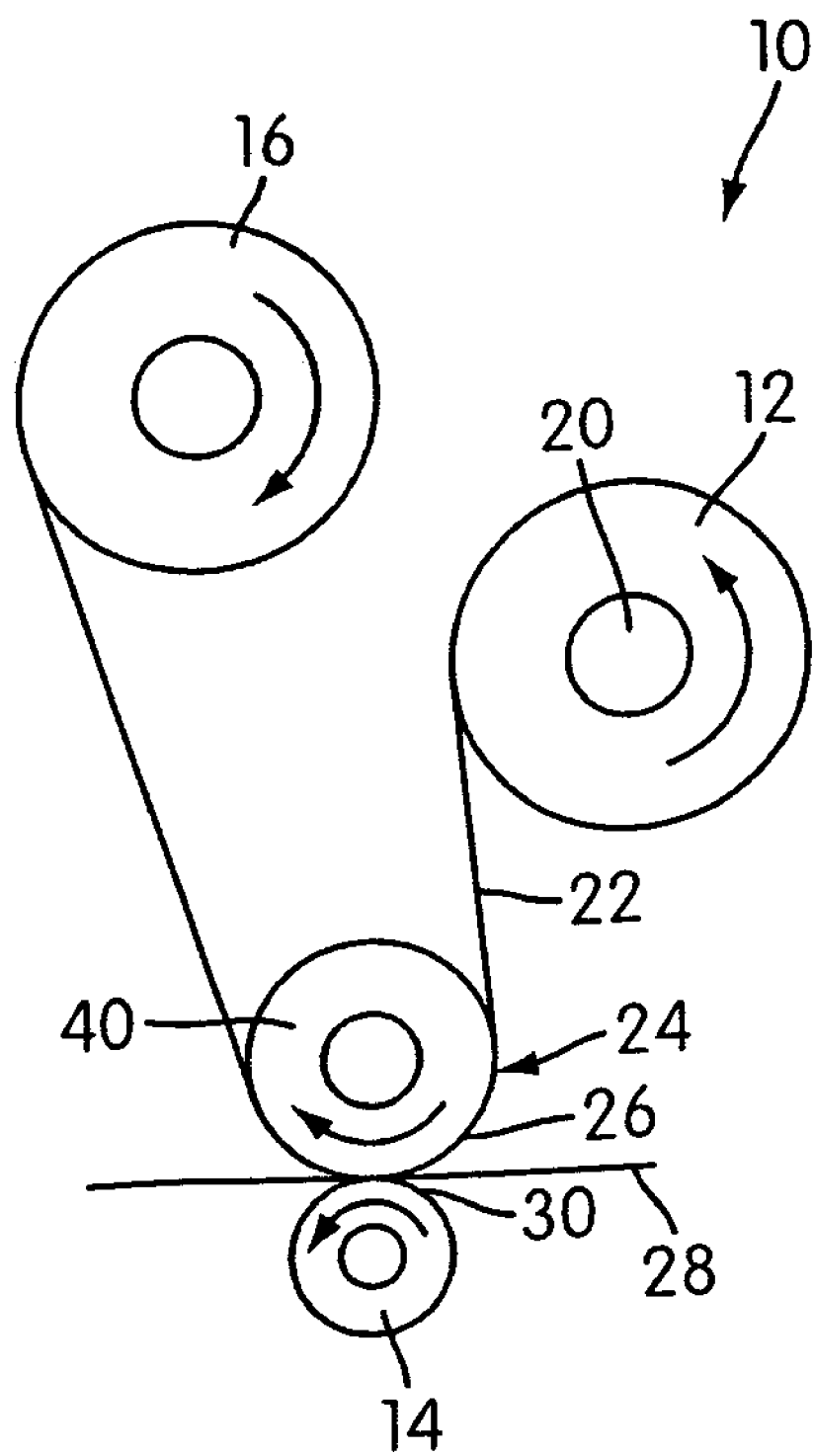
FIG. 4 is schematic view of internal components of the embodiment of FIGS. 3a and 3b.

FIG. 4 schematically shows the internal components of the embodiment shown in FIGS. 3a and 3b, which is an alternative to the arrangement in FIG. 2. As shown in FIG. 4, the transfer device 10 may further include a second pressure applicator member 40 that is positioned adjacent the first pressure applicator member 14 such that a pressure applying relation is created. It is contemplated that the second pressure applicator member 40 may also be a rotatable nip roller, or it may be a fixed structure. Because the supply roll 12 is not being used to create the pressure applying relation, the transfer substrate 22 need not be wound with the carrying surface 24 and the transferable material 26 facing radially outwardly, and instead may be wound in the conventional manner with the transferable material 26 facing radially inwardly.

Returning to FIG. 2, in operation, the target substrate 28 is placed in between the transfer substrate 22 and the pressure applicator member 14. Rotation of the take-up roll 16 is initiated by rotating the actuator 38 such that the transfer substrate 22 advances as the target substrate 28 proceeds through the transfer device 10. The transferable material 26 is transferred to the target substrate 28, but because of the non-stick characteristic of the engaging surface 30 of the pressure applicator member 14, any excess transferable material 26 remains on the transfer substrate 22. The transfer substrate 22 with the untransferred adhesive is wound up on the take-up roll 16. The transfer device illustrated in FIGS. 3a, 3b, and 4 operates in a similar manner.

If the supply roll 12 and take-up roll 16 are provided on a cartridge 34, as shown in FIGS. 3a and 3b, when the transfer substrate 22 has been depleted, i.e., the supply roll 12 is empty and the take-up roll 16 is full, the cartridge 34 may be removed and disposed of or recycled. A new cartridge with a new supply roll 12 of transfer substrate 22 may be inserted into the transfer device 10 for further operation. Of course, replacement can be done at any time when it is desired to change the transferable material.

Figure 5:
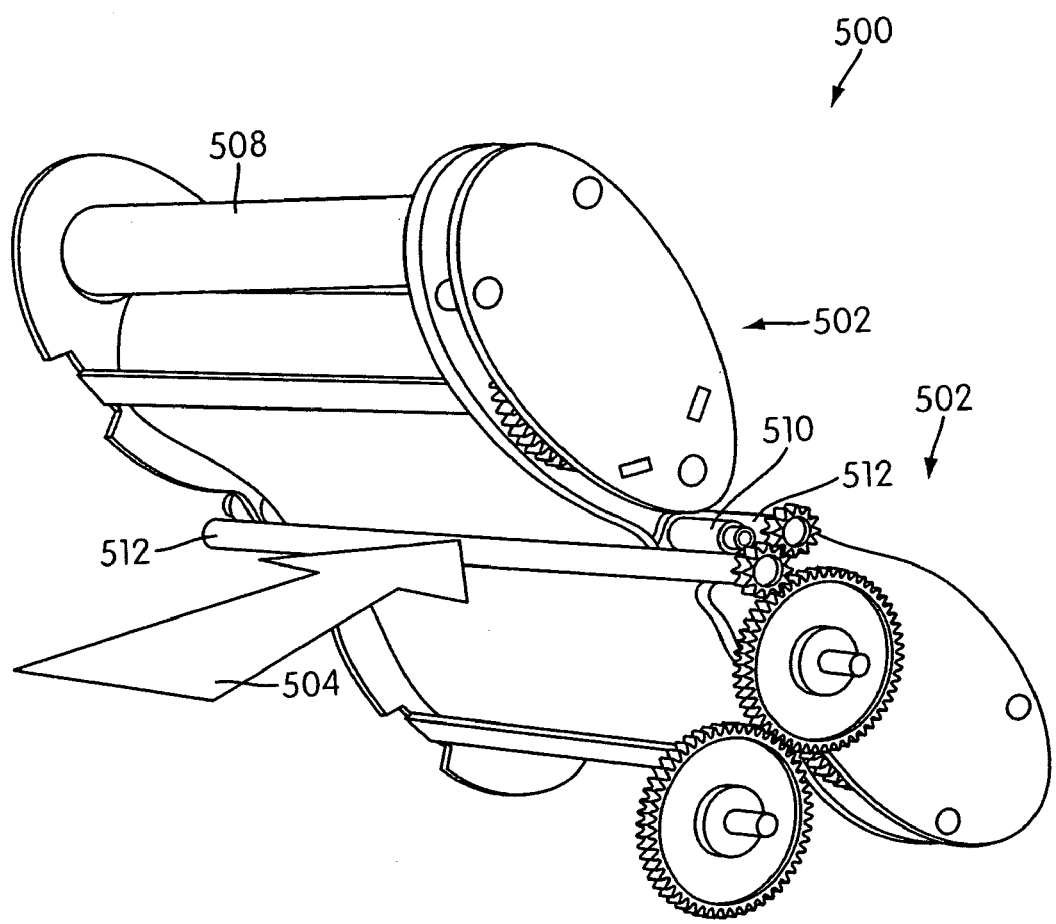
FIG. 5 is a perspective view of another embodiment of the transfer device of the present invention with the housing removed.

As shown in FIG. 5, in another embodiment, the transfer device 500 may include a pair of cartridges 502 (the housing of the transfer device 500 is not shown for clarity). In this way, both sides of a target substrate 504 may be treated. For example, one cartridge may include a transfer substrate with a pressure-sensitive adhesive disposed thereon as the transferable material, as discussed above. The second cartridge may include either an additional adhesive or another adhesive-type transferable material, such as a decorative material, such as glitter or confetti with adhesive thereon for adhering to the target substrate. If the second cartridge includes the additional adhesive, then double sided stickers may be created that may be used as two-sided tape.

Figure 6:
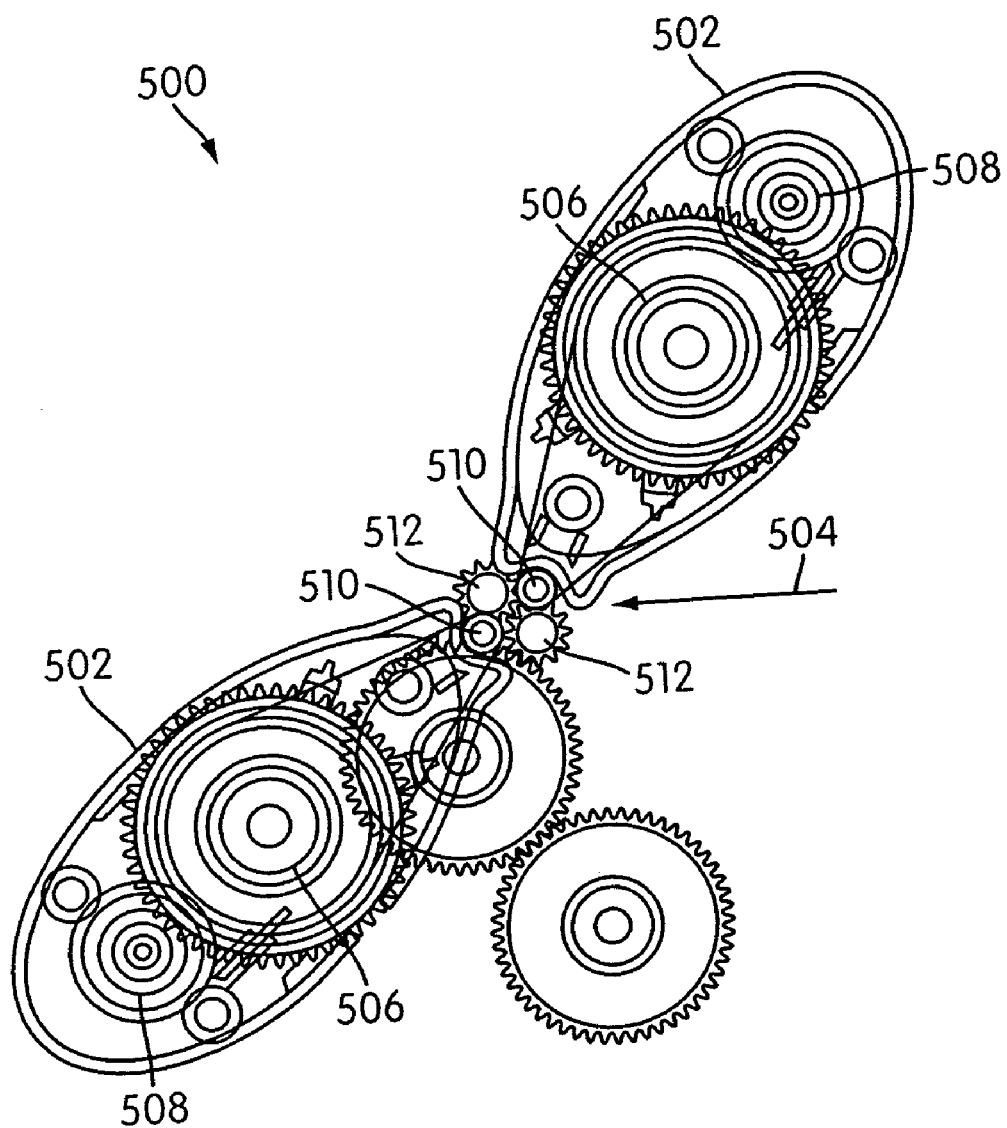
FIG. 6 is a side view of the transfer device of FIG. 5 with additional structure removed.

As shown in FIG. 6, each cartridge may include a supply roll 506, a take-up roll 508, and a pressure applicator member 510. The transfer device 500 further includes two additional pressure applicator members 512 mounted to the housing and against which pressure applicator members 510 are engaged in pressure applying relation similarly to the arrangement illustrated in FIG. 4.

Figure 7:
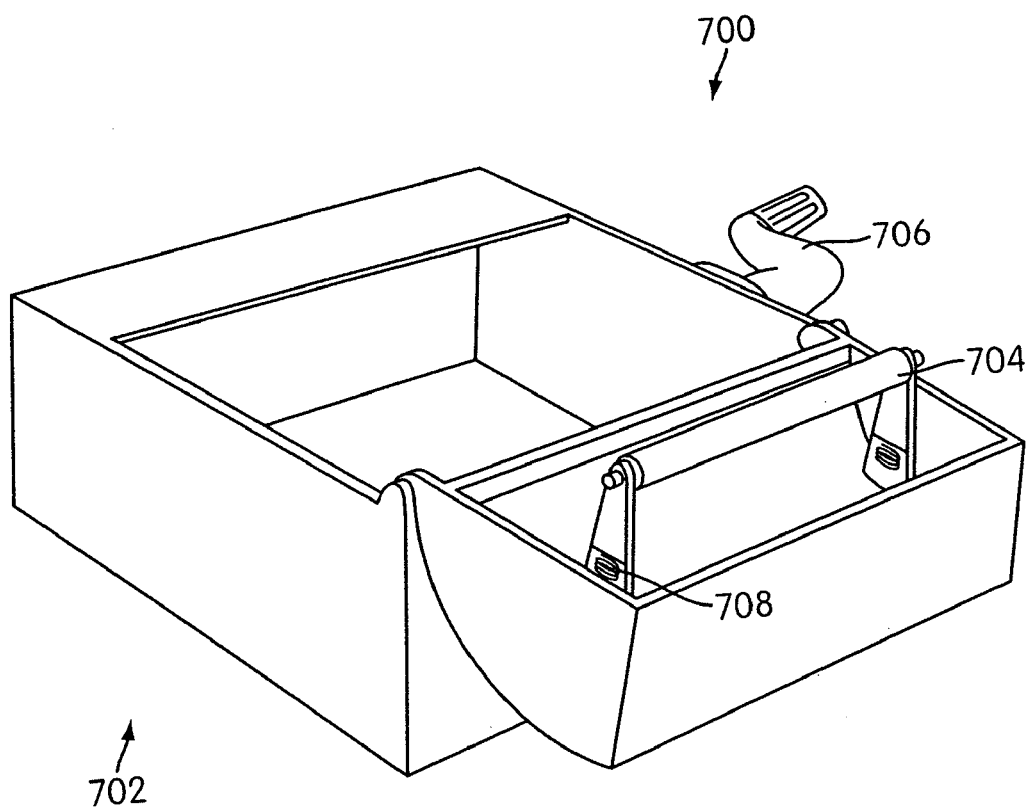
FIG. 7 is a perspective view of another embodiment of the transfer device of the present invention.
Figure 7A:
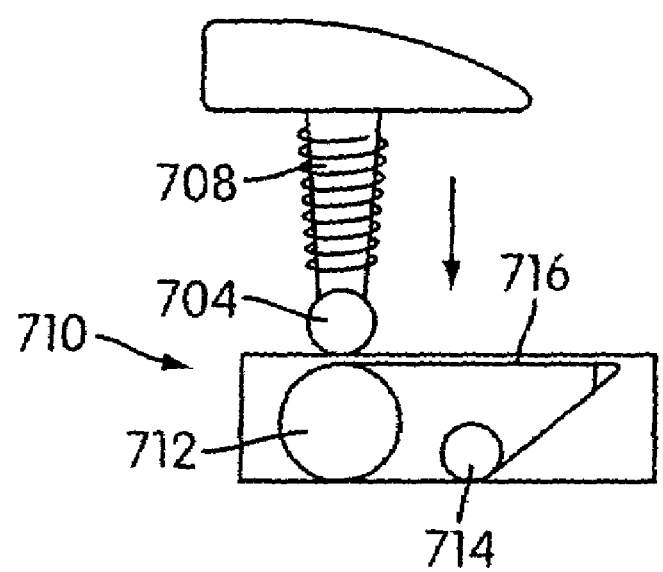
FIG. 7a is a side view of a single cartridge that may be used with the transfer device of FIG. 7.
Figure 7B:
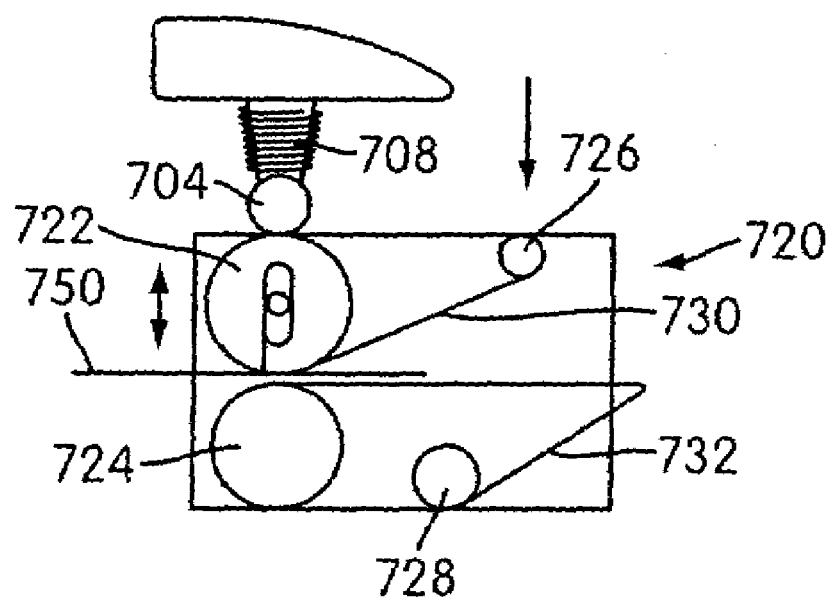
FIG. 7b is a side view of a double cartridge that may be used with the transfer device of FIG. 7.

FIG. 7 illustrates another embodiment of the present invention in which the transfer device 700 includes a box-like or other shaped housing 702. In this embodiment, a pressure applicator member 704 and an actuator 706 are rotatably coupled to the housing 702. A removable cartridge, such as a single cartridge 710, shown in FIG. 7a, or a double cartridge 720, shown in FIG. 7b, may be inserted into the housing 702.

The single cartridge 710 includes a supply roll 712, a take-up roll 714 and a transfer substrate 716. The double cartridge 720 includes a pair of supply rolls 722, 724, a pair of take-up rolls 726, 728 and two separate transfer substrates 730, 732. As described above, the transfer substrates 730, 732 may be of the same type, or may be of different types, depending on the desired application.

As shown in FIG. 7, the transfer device 700 may also include a biasing mechanism 708 that biases the pressure applicator member 704 towards a supply roll, such as supply roll 712 when the single cartridge 710 is used. This is further illustrated in FIGS. 7a and 7b. When a double cartridge is used, the biasing mechanism 708 may be used to bias the pressure applicator member 704 towards one of the supply rolls 722 and that supply roll 722 may move such that it applies pressure to the second supply roll 724. This arrangement ensures that the proper pressure is applied to the transfer substrates 730, 732 where they come into contact with a target substrate 750.

Figure 8A:
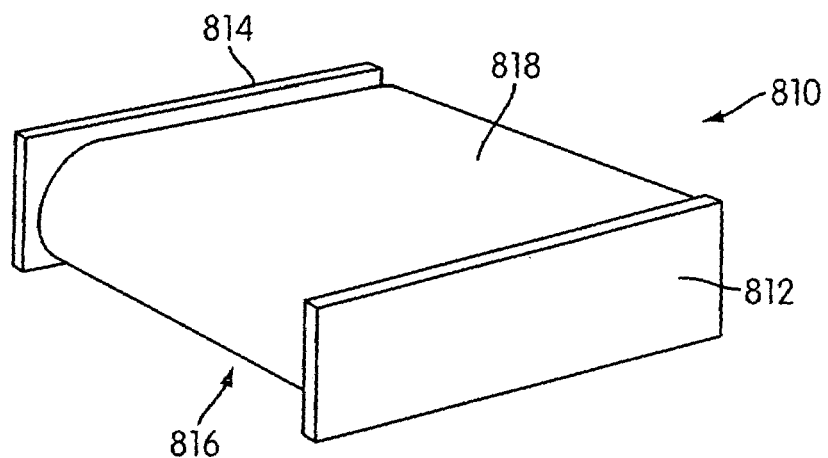
FIG. 8a is a perspective view of another embodiment of a single cartridge.
Figure 8B:
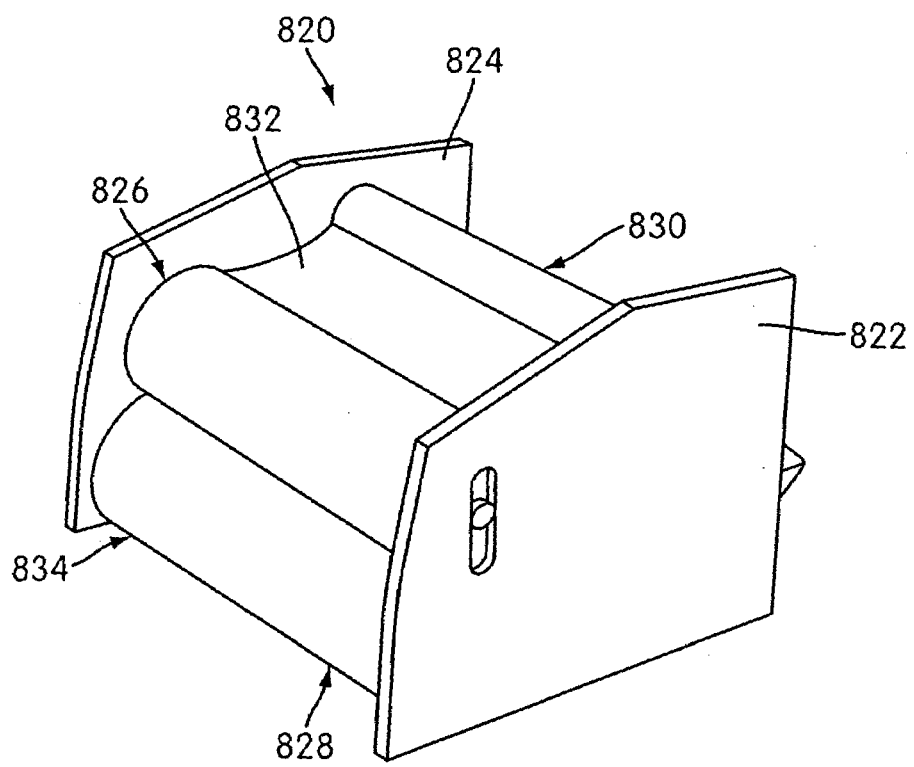
FIG. 8b is a perspective view of another embodiment of a double cartridge.

FIGS. 8a and 8b illustrate another embodiment of a single cartridge 810 and a double cartridge 820, respectively. In this embodiment, the single cartridge 810 includes a pair of side walls 812, 814, a supply roll 816, a take-up roll, and a transfer substrate 818 coupled to both the supply roll 816 and the take-up roll. The supply roll 816 and the take-up roll are disposed in between and are rotatably coupled to the pair of side walls 812, 814. Similarly, the double cartridge 820 includes a pair of side walls 822, 824, a pair of supply rolls 826, 828, a pair of take-up rolls 830 and two separate transfer substrates 832, 834. The supply rolls 826, 828 and take-up rolls 830 are disposed in between and are rotatably coupled to the pair of side walls 812, 814. One of the supply rolls 826 may be movable such that the proper pressure may be provided between the supply rolls 826, 828, no matter how much transfer substrate 822, 824 remains on each supply roll 826, 828.

Figure 9:
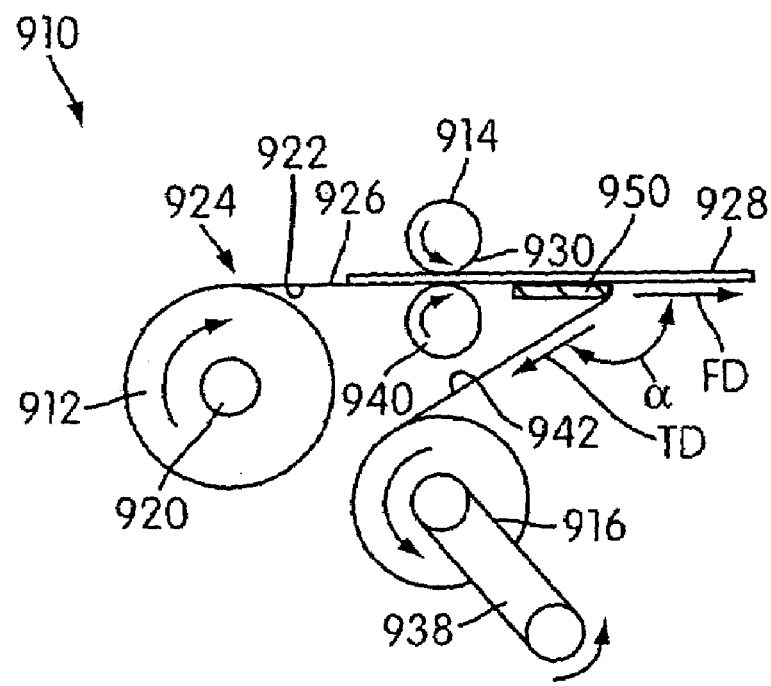
FIG. 9 is a schematic view of another embodiment of the transfer device of the present invention.

FIG. 9 illustrates another embodiment of a transfer device 910 of the present invention. The transfer device 910 includes a supply roll 912 that includes a core 920 and a wound supply of transfer substrate 922 that is wound about the core 920. The transfer substrate 922 has a carrying surface 924 on which an adhesive-type transferable material 926 is provided. The transfer substrate 922 is wound on the supply roll 912 such that the carrying surface 924 and the transferable material face radially outward.

As in the previously described embodiments, the adhesive-type transferable material 926 may be any type of material that sticks to the target substrate 928 by adherence. Generally, the transferable material 926 will be a pressure-sensitive adhesive provided on the carrying surface 924 in either a continuous coating or in a pattern coating. The amount of tack provided may be different depending on the particular adhesive that is used. For example, if a permanent sticker is desired, an adhesive that provides greater adhesion may be used as the transferable material 926. Similarly, if a removable sticker is desired, an adhesive that provides less adhesion may be used as the transferable material 926. This way, different transferable materials 926 may be provided that are designed for specific uses. Also, the transferable material 926 may include decorative items such as glitter, foil articles, etc. that use adhesive to stick to the target substrate 928 or are formed from material having a level of tackiness for sticking to the target substrate 928. Any other transferable material may be applied to the target substrate 928 and the invention is not limited to the illustrated examples.

In the illustrated embodiment, the transferable material 926 is an adhesive for sticker making and the transfer substrate 922 includes a differential release liner coated with release material on both the carrying surface 924 and a back surface. The release material on the back surface will prevent the transferable material 926 from bonding thereto when the transfer substrate 922 is wound about the core 920 and being unwound therefrom. The release material on the carrying surface 924 will allow the transferable material 926 thereon to transfer to the target substrate 928 upon the proper application of pressure without remaining bonded to the carrying surface 924. Thus, it is contemplated that the release material on the back surface may not have the same properties as the release material on the carrying surface 924, and typically it will have a lower affinity for adhesive bonding than the release material on the carrying surface 924. The release material may be silicone, a wax-like substance, or any other material that provides the desired release characteristics.

The device 910 also includes a first pressure applicator member 914 that is positioned in pressure applying relation adjacent the carrying surface of the transfer substrate 922 so as to enable a target substrate 928 to be advanced in a feeding direction FD between the first pressure applicator member 914 and the transfer substrate 922. This arrangement also enables the transfer substrate 922 to transfer at least a portion of the transferable material 926 from the transfer substrate 922 to the target substrate 928. The first pressure applicator member 914 preferably includes an engaging surface 930 that engages the target substrate 928 and the carrying surface 924 of the transfer substrate 922 during the transfer process. The engaging surface 930 has a release characteristic for essentially preventing the transferable material 926 from adhering to the first pressure applicator member 914. The engaging surface 930 may be plasma coated or may include a low release silicone or any other type of non-stick coating or material. The release characteristic of the engaging surface 930 is higher than the release characteristic of the carrying surface 924 such that any transferable material 926 that comes into contact with the engaging surface 930 remains on the transfer substrate 922. This way, as the transferable material 926 is being transferred to the target substrate 928, any excess transferable material 926 adjacent the target substrate 928 will remain on the transfer substrate 922 and will not adhere to the first pressure applicator member 914. The first pressure applicator member 914 may be a rotatable nip roller or may be of any design that achieves the desired result.

As shown, the transfer device 910 may also include a second pressure applicator member 940 that is positioned adjacent the first pressure applicator member 914. The second pressure applicator member 940 may also be a rotatable nip roller. The first and second pressure applicators 914, 940 are preferably biased toward one another, by known methods, such that the transfer substrate 922 extends between the first pressure application member 914 and the second transfer applicator member 940 so as to create the pressure applying relation.

In the embodiment shown in FIG. 9, a peel plate 950 is provided downstream from the first and second pressure applicator members 914, 940. The peel plate 950 is positioned so as to enable the target substrate 928 that has received the transferable material 926 to be separated from the transfer substrate 922. The peel plate 950 is configured and arranged to encourage separation by delamination of the target substrate 928 from the transfer substrate 922 by redirecting the transfer substrate 922 in a direction other than the feeding direction FD. The peel plate 950 may be constructed from any suitable material, provided it is stiff enough to be able to encourage separation of the target substrate 928 from the transfer substrate 922. For example, the peel plate 950 may be a metal or a stiff plastic material, or may even be made of stiff cardboard.

Figure 10:
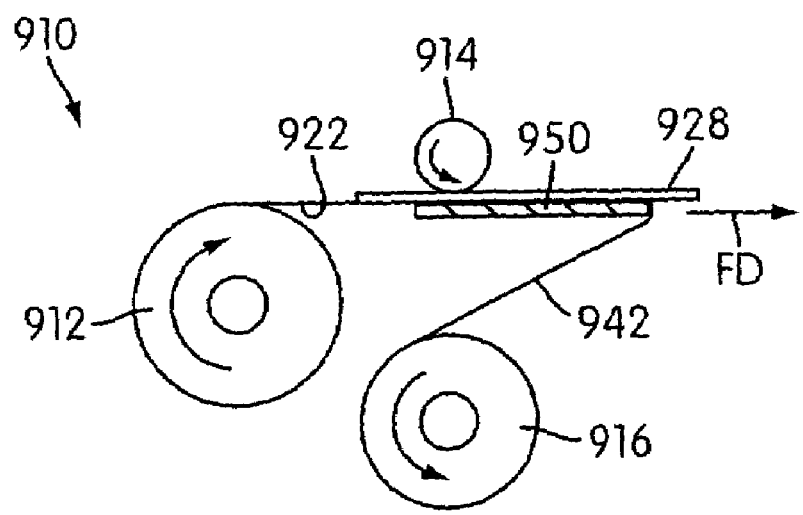
FIG. 10 is a schematic view of another embodiment of the transfer device of the present invention.

A take-up roll 916 for winding up spent portions 942 of the transfer substrate 922, from which the transferable material 926 has been transferred to the target substrate 928, is also provided. The take-up roll 916 is positioned in a take-up direction TD relative to the peel plate 950 such that the spent portions 942 of the transfer substrate 922 may travel in the take-up direction TD prior to being wound onto the take-up roll 916. The take-up direction TD is different than the feeding direction FD such that an angle $\alpha$ is defined between the two directions TD, FD. As shown, the angle $\alpha$ is between 90° and 180°. By re-directing the spent portions 942 of the transfer substrate 922 away from the feeding direction FD, the target substrate 928 will be more easily separated by extending out and delaminating from the transfer substrate 922 due to the greater stiffness of the target substrate 928. As would be appreciated by one of ordinary skill in the art, different configurations and arrangements of the peel plate 950 and the take-up roll 916 are possible and the invention is not limited to the arrangement shown in FIG. 9. For example, as shown in FIG. 10, the peel plate 950 may be disposed so that it is in pressure applying relation to the pressure applicator member 914 and the target substrate 928 and the transfer substrate 922 pass in between the pressure applicator member 914 and the peel plate 950.

The transfer device 910 may also include an actuator 938, also shown in FIG. 9, that is operatively connected to at least the take-up roll 916 such that it affects rotation of the take-up roll 916 for winding up the spent portions of the transfer substrate 922. By rotating the take-up roll 916, the supply roll 912 will necessarily rotate, so long as the transfer substrate 922 couples the two rolls 916, 912. The actuator 938 may be a crank handle, a knob, an electric motor, or any type of actuator known in the art.

While preferred embodiments of the invention have been shown and described, they are not intended to be limiting in any respect. To the contrary, the invention is intended to encompass all variations and modifications within the spirit and scope of the appended claims.

What is claimed is:

1. A transfer device for adhering a transferable material to a target substrate, the device comprising:

a supply of transfer substrate, the transfer substrate having a carrying surface and an adhesive-type transferable material provided on the carrying surface;

a pressure applicator member positioned in pressure applying relation adjacent the carrying surface of the transfer substrate so as to enable the target substrate to be advanced in a feeding direction between the pressure applicator member and the transfer substrate for transferring at least a portion of the transferable material from the transfer substrate to the target substrate;

the pressure applicator member having an engaging surface that engages the carrying surface of the transfer substrate and the transferable material thereon, the engaging surface having a release characteristic for essentially preventing the transferable material from adhering thereto so that, as the transferable material is being transferred to the target substrate, any excess transferable material adjacent the target substrate will remain on the transfer substrate;

a take-up roll for winding up spent portions of the transfer substrate from which the transferable material has been transferred to the target substrate; and a biasing structure biasing the supply and the pressure applicator member towards one another such that the carrying surface of the transfer substrate and the engaging surface of the pressure applicator member are pressed into engagement with one another to create the pressure applying relationship, the biasing structure continuing to bias the supply and the pressure applicator member towards one another as the transfer substrate is depleted from the supply to thereby maintain the pressure applying relationship.

2. A transfer device according to claim 1, wherein the pressure applicator member is a rotatable nip roller.

3. A transfer device according to claim 1, further comprising an actuator operatively connected to at least the take-up roll to affect rotation of the take-up roll for winding up of the spent transfer substrate.

4. A transfer device according to claim 1, wherein the supply of transfer substrate is wound in a roll.

5. A transfer device according to claim 1, further comprising a peel plate disposed between the supply of transfer substrate and the take-up roll, the peel plate providing an edge over which the transfer substrate is bent for facilitating delamination of the target substrate from the transfer substrate.

6. A device according to claim 5, wherein the peel plate is disposed downstream from the pressure applicator member in the feeding direction.

7. A device according to claim 5, wherein at least a portion of the peel plate is disposed in pressure applying relation to the pressure applicator member such that the transfer substrate and the target substrate pass in between the pressure applicator and the peel plate.

8. A device according to claim 5, wherein the peel plate and the take-up roll are positioned so that the transfer substrate is bent over the edge of the peel plate at an angle between 90° and 180° relative to the feeding direction.

* * * * *